(12) United States Patent
Hysom et al.

(10) Patent No.: US 7,239,985 B1
(45) Date of Patent: Jul. 3, 2007

(54) METHODS, SYSTEMS, AND DATA STRUCTURES FOR MODELING INFORMATION QUALITY AND MATURITY

(75) Inventors: Ronald R. Hysom, Mercer Island, WA (US); Duncan S. Coleman, Centerville, OH (US)

(73) Assignee: NCR Corporation, Dayton, OH (US)

( * ) Notice: Subject to any disclaimer, the term of this patent is extended or adjusted under 35 U.S.C. 154(b) by 680 days.

(21) Appl. No.: 10/668,837

(22) Filed: Sep. 23, 2003

(51) Int. Cl.
*G06F 17/50* (2006.01)

(52) U.S. Cl. .......................................... 703/1; 707/100
(58) Field of Classification Search .................... 703/1, 703/2
See application file for complete search history.

(56) References Cited

U.S. PATENT DOCUMENTS

| | | | |
|---|---|---|---|
| 4,785,399 A * | 11/1988 | Evans et al. ................. | 715/810 |
| 5,500,800 A | 3/1996 | Talbott | |
| 5,530,861 A | 6/1996 | Diamant et al. | |
| 5,551,880 A | 9/1996 | Bonnstetter et al. | |
| 5,655,086 A | 8/1997 | Jury et al. | |
| 5,662,478 A | 9/1997 | Smith, Jr. | |
| 5,918,232 A * | 6/1999 | Pouschine et al. ...... | 707/103 R |
| 6,205,447 B1 * | 3/2001 | Malloy ........................ | 707/102 |
| 6,581,068 B1 * | 6/2003 | Bensoussan et al. ..... | 707/104.1 |
| 6,629,065 B1 * | 9/2003 | Gadh et al. ..................... | 703/1 |
| 6,714,936 B1 * | 3/2004 | Nevin, III .................... | 707/102 |
| 6,877,006 B1 * | 4/2005 | Vasudevan .................... | 707/10 |
| 6,995,768 B2 * | 2/2006 | Jou et al. ..................... | 345/440 |
| 7,003,560 B1 * | 2/2006 | Mullen et al. .............. | 709/223 |
| 7,007,029 B1 * | 2/2006 | Chen ........................... | 707/100 |
| 7,089,266 B2 * | 8/2006 | Stolte et al. ............. | 707/104.1 |
| 2001/0039487 A1 * | 11/2001 | Hammersley et al. ......... | 703/2 |

OTHER PUBLICATIONS

Ponniah, Paulraj, "Data Warehousing Fundamentals: A Comprehensive Guide for IT Professionals", Chapters 3, 13, and 15, John Wiley & Sons, Inc., 2001.*
Hoxmeier, John A., "Topology of Database Quality Factors", Software Quality Journal 7, pp. 179-193, 1998.*

* cited by examiner

*Primary Examiner*—Paul Rodriguez
*Assistant Examiner*—Mary C. Jacob
(74) *Attorney, Agent, or Firm*—Schwegman, Lundberg, Woessner & Kluth, PA

(57) ABSTRACT

Methods, systems, and data structures for modeling information quality are provided. Information metrics, levels of maturity, and capabilities are integrated and linked with one another to provide an information quality and maturity assessment framework and tool. The framework is visualized and traversed in one or more dimensions. Sets of three metric values are provided to the tool for generating a current information quality state of a specific information repository. A desired information quality state is selected, and the tool generates a map of intermediate information quality states needed to optimally reach the desired state from the current state.

20 Claims, 5 Drawing Sheets

METHODS, SYSTEMS, AND DATA STRUCTURES FOR MODELING INFORMATION QUALITY AND MATURITY

FIELD OF THE INVENTION

The present invention relates to data warehousing and in particular to techniques for modeling information quality and maturity within information repositories.

BACKGROUND OF THE INVENTION

Organizations have become increasingly dependent on information collection and analysis in today's information age. Information gathering use to be done, if at all, primarily on print media filed in various physical locations, thus making data collection and subsequent analysis a process fraught with errors and manually intensive. Today information collected on traditional print media is likely converted into various usable electronic forms and stored in an information repository.

In an effort to facilitate better information collection and analysis a variety of vendors have provided software and hardware services for collecting, storing, and analyzing information. For example, a data warehouse assimilates and indexes information from a variety of disparate information repositories (e.g., electronic files, databases, and the like) to present a single organizational view of information.

The true value of an organization's data warehouse or information repository, however, depends on information quality (e.g., collection accuracy, types and variety of data, time coverage of data collected, and usable structure of data). Value also depends on information maturity. Information maturity can be viewed as error free and robust information having an up-to-date electronic structure with information needed by an organization to maximize the organization's internal knowledge base about its business. Accordingly, the traditional phrase "garbage in garbage out" still applies in the information industry.

Organizations and the economy are continually evolving with the ever changing market. Therefore, organizations find it extremely challenging to continuously improve the quality and maturity of their legacy information because of their limited organizational time, capital, and resources. As a result, many organizations are not aware of the true value in improving the quality and maturity of their information, since taking on such an exercise appears on the surface to be painfully expensive and time consuming.

Therefore, there exist a need to provide techniques for automatically modeling information quality and maturity. With such techniques, organizations can practically and efficiently analyze, plan, and move their information quality and maturity from a current state to a more desirable state.

SUMMARY OF THE INVENTION

In various embodiments of this invention teach modeling information quality and maturity. More specifically, and in one embodiment, a provided method models information quality and maturity. Quality metrics, levels of maturity, and quality capabilities are associated with one another. Further, an information quality map is provided, the map represents the quality metrics, the levels of maturity, and capabilities integrated and linked with one another on the map.

In still another embodiment of the present invention, another method to model information quality and maturity is taught. A service is used for accessing an interactive information modeling tool. Sets of three information quality metric values are provided to the information modeling tool based on metric variables defined in the information modeling tool. Moreover, a visual map is received from the service depicting an information quality current state for an information repository based on the provided values.

In another embodiment of the present invention, an information modeling system is presented. The information modeling system includes an information modeling tool and an interface for interacting with the information modeling tool. The information modeling tool models information quality and maturity for an information repository. The interface is used for providing information quality metric values for a current state of the information repository. Furthermore, the information modeling tool uses the information quality metric values to produce a map representing the current state.

In yet another embodiment of this invention, an information modeling data structure residing on a computer-accessible medium is provided for modeling information quality. The data structure includes quality metric variables, quality level values, and quality capability values. Sets of three metric values that are assigned to three of the metric variables are uniquely associated and linked with three of the quality level values and a single quality capability value.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims and their equivalents.

In various embodiments of this invention, information includes electronic data. The electronic data further includes values and labels, fields, or variables associated with identifying specific data values. For example, a piece of information can include a data field or variable definition "name," and another piece of that information can include a data value "Ron." An Information repository houses the information from any storage location (e.g., electronic files, databases, data warehouses, and others). In one embodiment, the information resides in the Teradata warehouse, distributed by NCR Corporation of Dayton, Ohio. Of course, other types of information repositories can be used with the teachings of embodiments for this invention.

Figure 1:
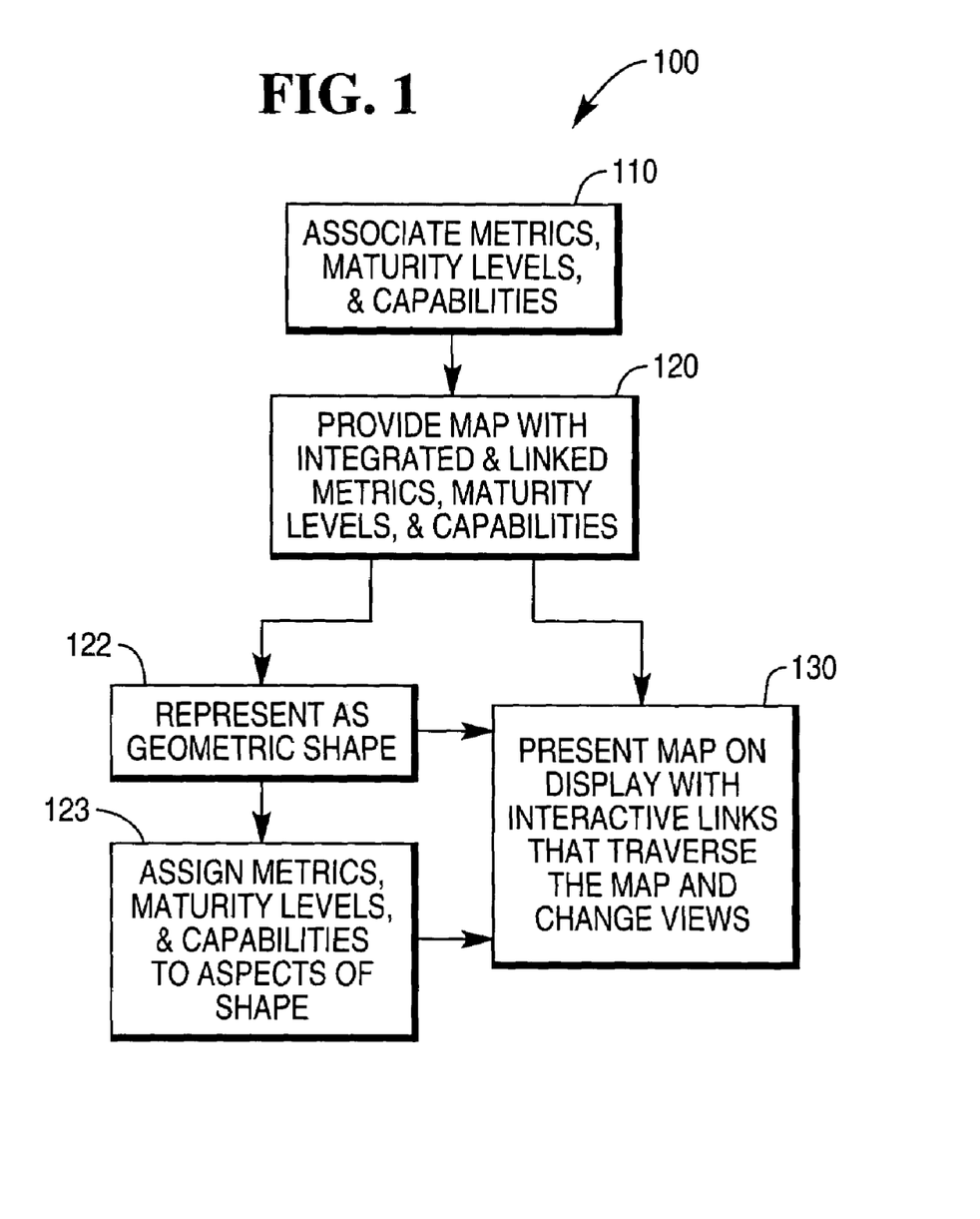
FIG. 1 depicts a flow diagram representing a method for modeling information quality and maturity, according to one embodiment of the present invention.

FIG. 1 depicts a flow diagram representing one method 100 for modeling information quality and maturity. The processing of the method 100 resides in a computer-accessible medium as one or more software applications or services. The applications or services can be accessed and interfaced to other applications or services through remote or local network connections. In one embodiment, the method 100 provides a service to an organization for visualizing various aspects of information quality and maturity.

An information quality metric describes objective attributes about information. In one embodiment, quality metrics represent twelve objective attributes. A "functionality" attribute describes to what extent the information provides functional capabilities to meet the needs of an organization. An "integrity" attribute describes the extent of security being applied to that information. "Sufficiency" indicates whether the information includes enough electronic data needed to meet an organization's needs. "Usability" includes objective descriptions as to how easy the information can be consumed. "Contextual" attributes represent whether all pertinent electronic data presents itself within the information. A "complexity" attribute describes the level of detail included within the information. "Responsiveness" refers to the timeliness of delivering the information. An "adaptability" attribute provides a description reflecting the extent to which the information can be altered to meet an organization's needs. "Robustness" indicates the extent to which the information is consistent. "Affordability" provides an indication as to the acceptability of expense associated with capturing and maintaining the information. Finally, "accessibility" describes the level of effort necessary to acquire the information in the first instance.

Embodiments of this invention are not intended to be restricted to the above enumerated quality metrics. One or ordinary skill in the art appreciates that other quality metrics can be defined and used for accessing information quality within a generic framework.

Levels of information maturity represent the extent to which conditions of the information fall within objective categories or standards for each or the quality metrics. In one embodiment, the levels of maturity are represented by five objective categories: "breakthrough," "leading edge," "advanced," "intermediate," and "foundation." A "breakthrough" category indicates a best category for a condition of the information that far exceeds the condition of information in the industry. "Leading edge" categories reflect information conditions which provide an organization a competitive edge in the industry. An "advanced" category describes an information condition determined to be ahead of most competitors of an organization. "Intermediate" categories indicate an information condition in transition or determined to be average within the industry. Finally, a "foundation" condition represents a beginning or initial information condition, likely not desirable or useful to an organization.

Again, other objective levels of information maturity can be used with embodiments of this invention. Moreover, different levels of granularity can be used. All such variations are intended to fall within the scope of this invention.

Each set of three quality metric and level of maturity pairs can be further associated with an objective information quality capability. In one embodiment, information quality capabilities include eight objective definitions. A "power" capability reflects information having quality metrics values for functionality, usability, and contextual. A "meaningful" capability indicates information can address all pertinent aspects at a required level of detail. "Meaningful" capabilities have quality metric values for integrity, contextual, and complexity. A "productivity" capability indicates the information can handle a sufficient amount of the information at the needed level of detail and without any disruptive delay. The "productivity" capability has quality metric values for sufficiency, complexity, and responsiveness. A "utilization" capability represents information this is ready when needed, easy to use, and provided without any disruptive delay. The "utilization" capability includes quality metric values for availability, usability, and responsiveness. "Scalability" capabilities support a sufficient amount of information as that data changes to address organizational growth while the information remains reliably consistent. The "scalability" capabilities include quality metric values for sufficiency, adaptability, and robustness. A "resiliency" capability represents information kept reliably consistent at an acceptable expense while being maintained in a secure fashion. The "resiliency" capability includes quality metric values for integrity, robustness, and affordability. The "serviceability" capabilities describe information that can be changed to meet growth needs in an easily obtainable fashion and ready when needed. "Serviceability" capabilities include quality metric values for availability, adaptability, and accessibility. Finally, a "value" capability represents information that meets an organization's needs in an easily obtainable fashion at an acceptable expense. The "value" capability includes quality metric values for functionality, affordability, and accessibility.

Again, other capabilities associates with quality metric values can be used with embodiments of this invention. It is appropriate to note at this point that quality metrics are electronically represented as labels, variables, or fields, each of which, at some point, can be assigned a unique value for each quality metric. The values can be binary (e.g., "yes" or "no") or the values can be a numeric or alphanumeric value that slides along a predefined scale having a lower bounded value and an upper bounded value. In a like manner, information quality levels and information quality capabilities, can in some embodiments, possess values of a similar nature to that of quality metric values.

The processing embodied by the method 100 assembles, links, and associates the information quality metrics, levels of maturity, and the capabilities into an information quality and maturity map or model. This processing represents novel techniques for visualizing information quality and maturity. The map can be interacted with electronically to traverse various relationships of information quality and maturity.

At 110, an application(s) or service(s) embodying the processing of method 100 associate information quality metrics, levels of maturity, and capabilities. The quality metric labels, variables, or definitions and their corresponding dependencies upon values for quality levels and capabilities can be acquired from a variety of techniques, such as through an Application Programming Interface (API) communicating between the application or service, automatically from an electronic data source, and the like. In embodiments that use an API, some applications within that API can permit a business analyst to manually provide specific quality metric variable definitions and specific values for those definitions. Moreover, the API can permit a business analyst to provide quality level and capability values and their corresponding dependencies with specific sets of quality metric values.

Dependencies are pre-determined based on knowledge possessed by one of ordinary skill in the information quality arts. In some cases, these dependencies are then communicated via traditional off-the-shelf software packages, such as Metis or others. In other cases, these dependencies can be communicated using custom-developed APIs. An example dependency might be that one cannot move directly from a quality level of breakthrough to a quality level of anything but leading edge. Again, these dependencies are readily obtainable and derived by one or ordinary skill in the information quality arts.

The application(s) or service(s) embodying the processing of the method 100 generates a map data structure once the quality metrics, levels of maturity, capabilities, and dependencies are received. Any electronic data structure or combination of data structures can be implemented to provide the functionality of a map (e.g., trees, hash tables, lists, stacks, custom-developed object data structures, and others). At 120, the application or service provides the map via an interface for presentation within a display at 130 to a requestor (e.g., consumer, user, or business analyst).

In one embodiment, the map represents a geometric shape at 122. A geometric and visual depiction of the map can assist the requestor in better visualizing and comprehending, in a single presentation or view, all the intricate dependencies among the quality metrics, levels of maturity, and capabilities.

Figure 5:
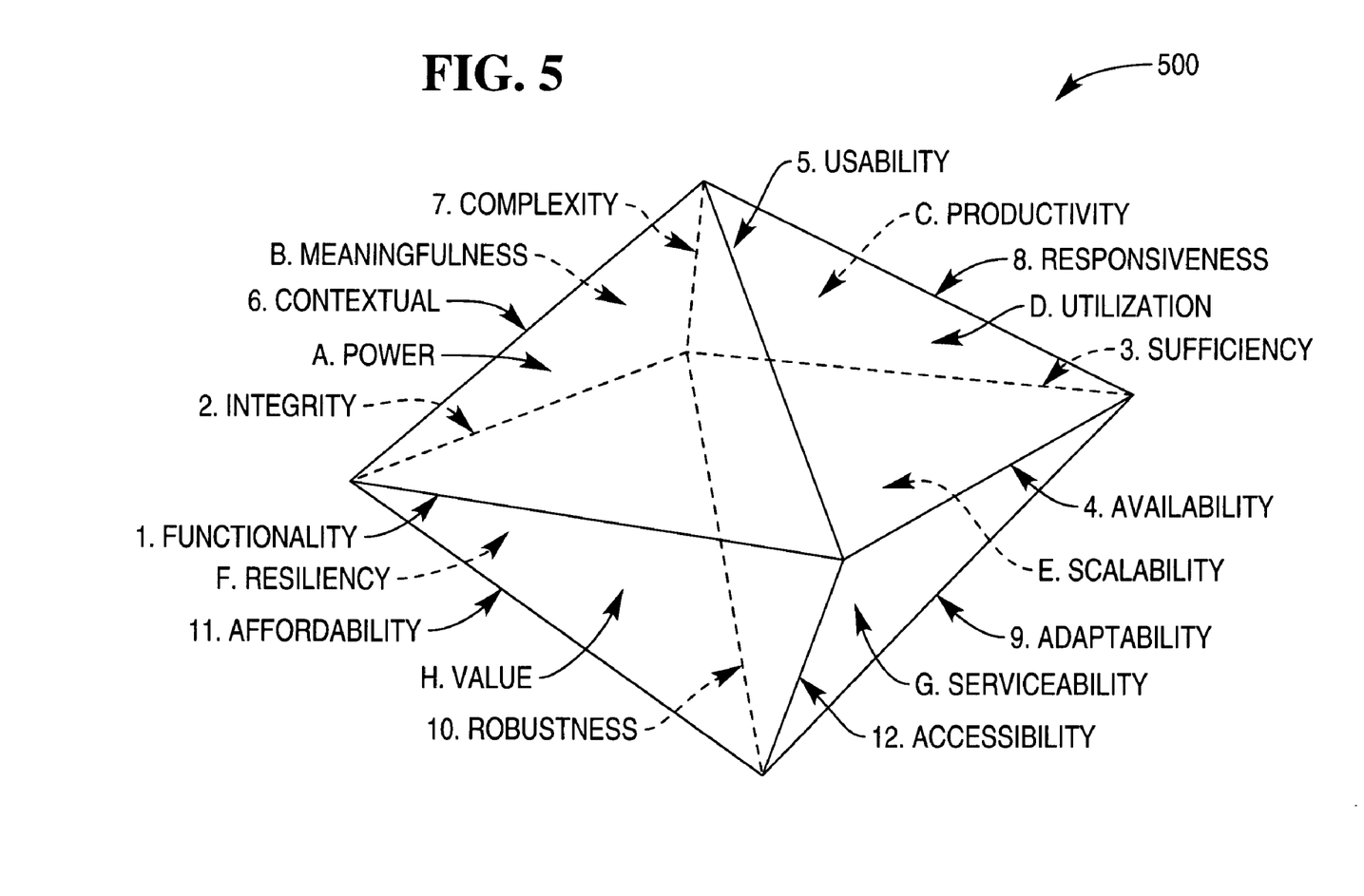
FIG. 5 depicts a diagram representing an example three-dimensional geometric shape or object depicting a sample information quality and maturity model.

In one embodiment, the geometric shape is represented as a three-dimensional electronic object, such as an octahedron (or diamond) depicted at 500 of FIG. 5. This example visual depiction is presented in FIG. 5 and is further discussed below. Connecting lines of the object represent visually each unique information quality metric. Any three connecting lines (three specific metric values) form a surface area that represents a unique capability. Moreover, for each specific metric value a unique information level of maturity is readily discernable. In some embodiments, for each set of three metric values and unique capability, a single unique level of maturity is readily discernable, at 123.

An API or other interface can communicate interactively with the map (or three-dimensional object) to expand, traverse, and investigate various dependencies associated with the quality metrics, levels of maturity, and capabilities. Thus, the map can include activation links that when selected or activated provide different views within an electronic display for a recipient (user).

The embodiments of the method 100 permit an organization to interactively view, traverse, and investigate various information quality attributes and dependencies. In one embodiment, the interaction occurs by an organization's business analysts that accesses a remote service (embodying the processing of the method 100) from a World-Wide Web (WWW) portal using an interface defined in Hypertext Markup Language (HTML). This provides the analyst a framework for analyzing information quality models.

Figure 2:
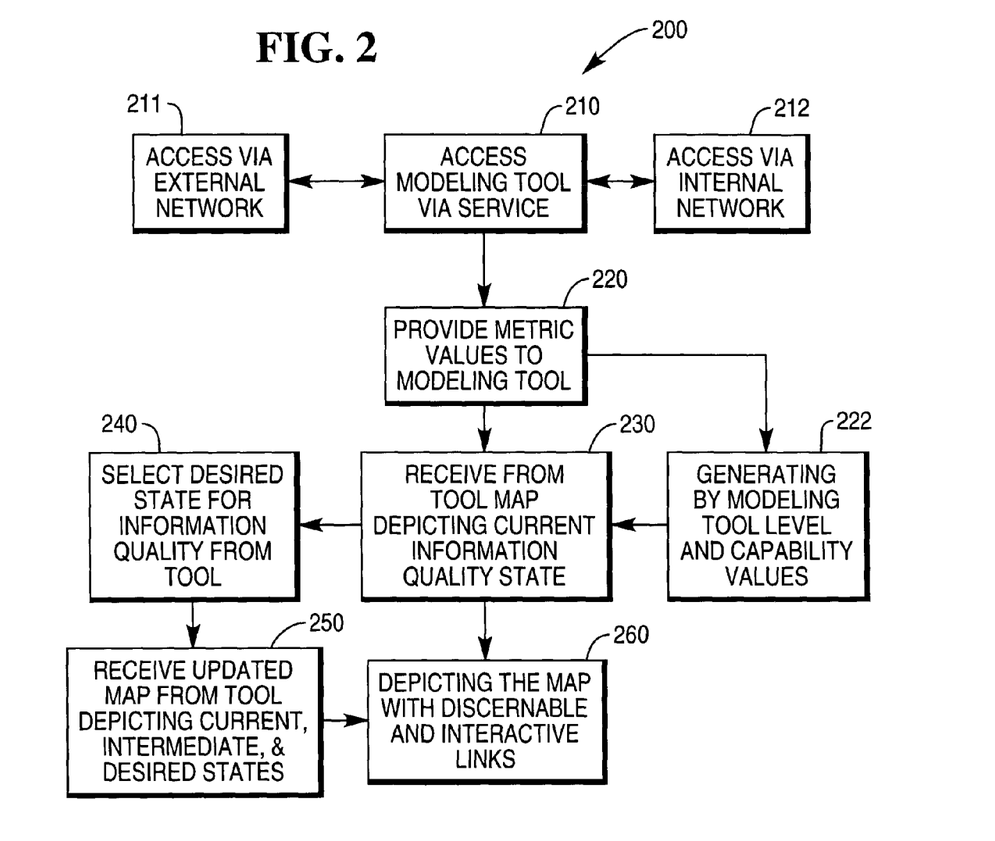
FIG. 2 depicts a flow diagram representing another method for modeling information quality and maturity, according to another embodiment of the present invention.

FIG. 2 depicts a flow diagram representing another method 200 for modeling information quality and maturity. The processing of the method 200 expands on the processing performed by the method 100 of FIG. 1. Furthermore, the processing of the method 200 occurs in a computer accessible medium and can be implemented as one or more electronic services or applications. In some embodiments, those applications form an electronic interface interacted with by a business analyst to communicate with the processing of the method 100.

Again, with embodiments of the method 200, information quality metrics, levels of maturity, capabilities, and their associated dependencies on one another combine to form an information quality and maturity framework or model embodied as an interactive electronic data structure. The model can be accessed and manipulated by communicating with a service having an interactive information modeling tool which manages and controls the model. In some embodiments, the service and tool are accessed over an internal network connection to the interface embodied by the processing of the method 200. Alternatively, they are accessed over an external network connection by the interface.

At 210, a service is accessed for communicating with an interactive modeling tool. The access can occur, in one embodiment, via an external network connection, or alternatively, an internal network connection, as depicted as 211 and 212, respectively. Access is made as an interface application that embodies the processing of the method 200. In one embodiment, the interface is manually accessed by a business analyst or user. In other embodiments, the interface is an API that permits automatic access based on other applications issuing calls to various API features permitting the same.

At 220, the interface provides quality metric values to the information modeling tool. Each set of three quality metric values represents unique values for three specific quality metric variables or labels defined and managed by the tool. In one embodiment, at 222, the modeling tool can receive the provided sets of three metric values from the interface and then uses the provided values for automatically assigning (based on the dependencies of the information model) an appropriate corresponding value for a capability. Moreover, based on the dependencies and values for each metric variable, the tool can also assigns an appropriate corresponding value for a level of maturity.

Again, values represent binary (e.g., "yes" or "no") quantities or quantities associated with a numeric or alphanumeric scale. Thus, for example, the interface can assign a "yes" value to quality metric variables defined as functionality, usability, and contextual. Based on these assignments a "yes" value is automatically assigned by the tool for the capability of power. The interface can still further assign a "1" value on a scale of "1-10" to a level of maturity for broadening, where 1 is the best value associated with the scale.

Metric values are determined based on an assessment of an information repository and provided to the information modeling tool using an interface that embodies the processing of the method 200. The tool then assigns those values to their appropriate quality metric variables, generates automatic values for levels of maturity and capabilities (for each set of three metric values), and produces a visual map for the interface depicting a current information quality and maturity state for the information repository.

Thus, at 230, the interface receives the visual map depicting a current information quality state for an information repository, where the current state is based on the initial sets of three metric values provided to the tool. The visual map distinguishes the current state with its various assigned values (metric, levels, and capabilities) within a view of an electronic display in communication with the interface. The view presents the entire visual map along with the discernable current state. Visual distinctions can be made in a number of ways, such as with font sizes, font effects, font types, colors, and the like.

In one embodiment, the interface also permits the visual map to be manipulated interactively within the view, such that at 240, a desired information quality and maturity state can be selected. This desired state is then communicated from the interface to the modeling tool via the service, and the tool assigns the appropriate values to a set of the metric variables (defined by the desired state selection), three levels of maturity corresponding to each metric variable, and a single capability for the desired state.

Next, the tool, using the current state and the desired state, selects a pathway within the map for moving from the current state to the desired state. Dependencies can be weighted, in some embodiments, within the map and selection can be based on iteratively evaluating the available moves within the map in the direction of the desired state from the current state. These optimal selections produce one or more intermediate states within the map from the current state to the desired state and form an optimal pathway for moving a current information quality and maturity from its present condition to a desired position.

Thus, in one embodiment, at 250, the interface receives an updated visual map from the information quality tool that uniquely depicts the entire map along with the current state, the intermediate states, and the desired state. Each of the intermediate states have values for metric variables, corresponding level values, and a single corresponding capability value, which need to be achieved within the information repository before a transition can be made to a next and connecting intermediate state, and until the desired state is finally achieved.

At 260, this updated visual map is depicted with discernable links within the interface, and these links are selectable such that the needed actions can be inspected. In some embodiments, the actions can be further customized to be associated with tasks which are organization specific. The items or tasks detail what steps, internal to the organization's processes and technology which need to take place in order to achieve each of the intermediate states depicted within the visual map.

Embodiments of the method 200 permit various interface applications or services to be used in an automated fashion for determining how to move an information repository from a current quality and maturity state to a desired quality and maturity state. The interface can be made available to business analysts or information analysts familiar with the information repository. Thus, an organization can develop a road map for moving their information repository to a more desirable condition that is more conducive and helpful to the organizational planning and business.

Figure 3:
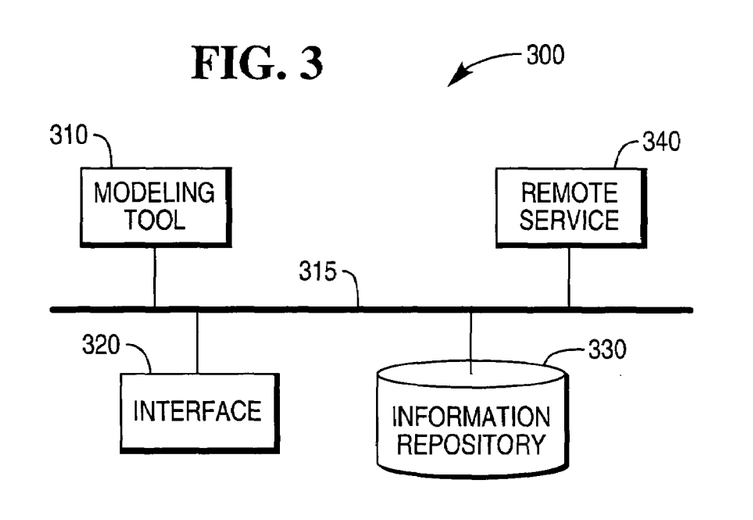
FIG. 3 depicts a block diagram representing an information modeling system, according to one embodiment of the present invention.

FIG. 3 depicts a block diagram representing an information modeling system 300. The modeling system 300 is implemented in a computer-accessible medium or media and processes on one or more computing devices interfaced over a network 315 with one another. The modeling system 300 includes an information modeling tool 310 and an interface 320. The system uses an information repository 330 and a remote service 340.

The modeling tool 300 models information quality and maturity for the information repository 330. This is achieved by having a pre-defined framework or model for generic information quality and maturity depicting the quality metrics, levels of maturity, capabilities, and their associated dependencies. The model or framework can be represented as an electronic data structure, such as a map, a geometric shape, and the like. The model can be traversed and interacted with through the interface 320.

The interface 320 is used for accessing the service 340 to execute and process the tool 310, and to acquire visually on a display the initial model for a generic information quality and maturity framework. The interface 320 is then used to provide, values for sets of three information quality metric variables defined in the model. These values represent a current state within the model for the information repository's 330 current information quality and maturity based on an assessment (metric value assignments) made by a business analyst or information analyst of an organization with an interest in the information repository 330.

The tool 310 uses these value assignments for producing an initial map within the model on a display accessible to the interface 320. The tool 310 then updates the model or map and communicates the updated map or model back to the display where it can be further interacted with by the interface 320. The display now includes the original information model provided by the tool 310 and a visual depiction of interface 320 accessible links within the model or map of the current state for the current state of information quality and maturity associated with the information repository 330. This includes a unique value for each capability assigned to every set of three metric values provided, and a value for a level of maturity for each metric value provided.

Next, the interface 320 is used for interactively communicate with the model or map via the displayed links. One such interaction selects a desired state for the quality and maturity of the information repository 330. Based on this interface 320 selection, the tool 310 can automatically determine appropriate metric variable values, levels of maturity values, and a capability value within the model or map for the desired state.

In doing this, the tool 310 can generate value selections (for levels and a capability) within the model or map for optimally (based on weighted dependencies) moving from the current information quality state progressively through the model or map to the desired information quality state. Each of these moves include a set of three needed quality metric variable values, three levels of maturity values, and a capability value, which define a specific intermediate state that the information repository 330 needs to achieve in order to progress from the current state to the desired state within the model or map. These progressive intermediate states along with the current state and the desired state are then communicated back to the interface 320 via the display as an updated map or model. Moreover, the current state, intermediate states, and desired state are visually discernable within a single view of the display with interactive links for obtaining or traversing the model or map for additional information or the capabilities of each particular state.

In some embodiments, the progression from the current state through the intermediate states to the desired state can be viewed as a pathway within the model or map on the display. Each link associated with particular transitions from one state to another state can be activated from the display via the interface 320 to identify specific values for a set of three metric variables, a set of three levels of maturity, and a capability required for in moving to a next state.

Other information can be included with the links as well and can be customized to the needs of a particular information repository 330. For example, an organization can include information for specific information technology, such as a Teradata warehouse version X processing on a UNIX Operating System (OS). Another example might be that certain types of information which needs to have a peer review before it is altered or needs to include data not currently being captured by the organization. This other information can reside within the access and control of the service 340 and/or tool 310 or it can reside within the environment of the interface 320, where either the interface 320, independent of the tool 310, or the tool 310 can make it accessible with the links via the model or map. This other information can be used as an action item list for an organization for moving its information repository to a desired state from a current state.

The configuration of FIG. 3 is presented for purposes of illustration only. Other configurations can exist with embodiments of the modeling system and are intended to be included with this invention.

Figure 4:
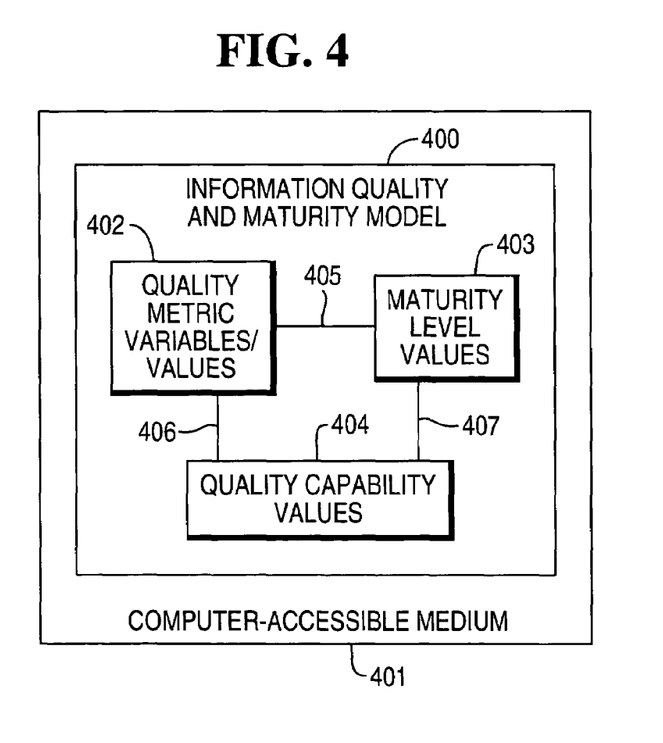
FIG. 4 depicts a block diagram representing an information modeling data structure, according to one embodiment of the present invention.

FIG. 4 depicts a block diagram representing one information modeling data structure 400 residing in a computer-accessible medium or media 401. The modeling data structure 400 represents a framework, model, or map of generic and specific information quality and maturity for a generic information repository or a specific information repository.

The modeling data structure 400 includes quality metric variables (e.g., labels, constant strings, or definitions) and values 402, quality maturity level values 403, quality capability values 404, and dependencies (logical links) 405-407 among all the metric variables and values 402-404 with respect to the level values 403 and capability values 404.

At least for purposes of initially populating and electronically viewing the modeling data structure, the modeling data structure 400 includes all known metric variables and values 402-404 that were predefined and instantiated within the modeling data structure 400 by another interface. Each instance of the modeling data structure 400 in its initially populated state can be tailored based on specific industries (e.g., retail, manufacturing, government, non-profit, software, hardware, and others). Such a predetermination can be done by business analysts and/or information analysts. In an alternative embodiment, applications can be implemented that process a specific data format, such that the modeling data structure 400 can be initially instantiated automatically.

The logical links 405-407 combine with the metric variables and values 402-404 to uniquely define a particular instance of the modeling data structure 400 as an information model. The information model is used for modeling the quality and maturity of information associated with a particular industry in a generic framework or standard readily recognized by that industry. Moreover, although FIG. 5 depicts only three links 405-407, this is presented for purposes of illustration only since it is readily apparent that in fact there can be a great deal of linkages all formed based on each defined dependency between any set of three metric variables and values 402-404.

In some embodiments, a particular instance of the modeling data structure 400 can be interacted with and modified via an interface in communication with the modeling data structure 400. In one such instance, the interface is a World-Wide Web (WWW) browser connected to the Internet that communicates with other applications residing on a remote server of the Internet, and those applications interact with the browser to display the modeling data structure 400 on a display and computing device using the browser to present and update views of the modeling data structure 400.

Thus, in some embodiments, a specific instance of the modeling data structure receives specific values for at least a number of the quality metric variables 402. These received quality metric value 402 assignments can be used by other applications in communication with the modeling data structure 400 for generating specific needed values for maturity levels and quality capabilities 403-404 (one value for each quality capability per three metric values).

Received specific value assignments 402-404 can represent a desire from some application to view within a particular instance of the modeling data structure 400 a current state, intermediate states, and/or a desired state for a specific information repository being compared and analyzed with this particular instance of the modeling data structure 400. The current state and the desired state are selectable and used to modify aspects of the modeling data structure 400. Conversely, the intermediate states are calculated by an application or system consuming the modeling data structure 400. Such an application can be the processing represented by the methods 100 and 200, and such a system can be the system 300.

Any dynamically modified instance of the modeling data structure 400 can also be consumed by an interface for purposes of uniquely and visually depicting the variables, values, and links 402-407 on a display which presents the modified instance of the data structure 400 for consumption. The links 405-407 can not only depict dependencies but can be activated to traverse and alter views associated with the data structure 400.

Embodiments of the modeling data structure 400 can be consumed by applications, systems, and/or services to model and analyze generic information quality and maturity dependencies and capabilities for a customized industry. Moreover, the modeling data structure 400 can be consumed and dynamically interacted with to analyze a specific information standard in view of a specific information repository current state for information quality and maturity. This particular consumption can also be used to provide a roadmap for an organization to move from their current quality and maturity state though a number of intermediate states to a final desired state.

FIG. 5 depicts a diagram representing an example three-dimensional geometric shape or object depicting a sample information quality and maturity model 500. FIG. 5 is presented for purposes of illustration only, and was referenced as an example in the discussion with FIG. 1. A variety of additional shapes or object data structures can be used to visually represent and communicate the information quality and maturity frameworks taught by embodiments of this invention.

Diagram 500 presents a sample view of information models or frameworks using the teachings of this invention. In the example, an octahedron (or diamond shape) electronically instantiated object is presented where the sample information quality metrics, levels, and capabilities have been previously defined and enumerated above in connection with the discussion of FIG. 1. The metrics, levels, and capabilities are visually depicted and associated within the octahedron object. All relationships between the metrics, levels, and capabilities are visibly discernable and viewable within a single view. This view can be presented within a display and dynamically interacted with my methods 100 and 200, systems 300, and data structures 400 described in the embodiments of this invention.

As one example relationship, the metric values of functionality, usability, and contextual form a surface triangle on the octahedron. Moreover, the dependent and associated capability value is depicted as the surface of this triangle as power. Additionally, each of the metric variable values can be associated with a level of maturity value of advanced, intermediate, and breakthrough which is displayed when a line of the triangle is selected or by a unique color for lines of the triangle. This view can be achieved to produce a tree-dimensional distinction using various font effects, sizes, colors, types, and other graphics including video.

Figure 6:
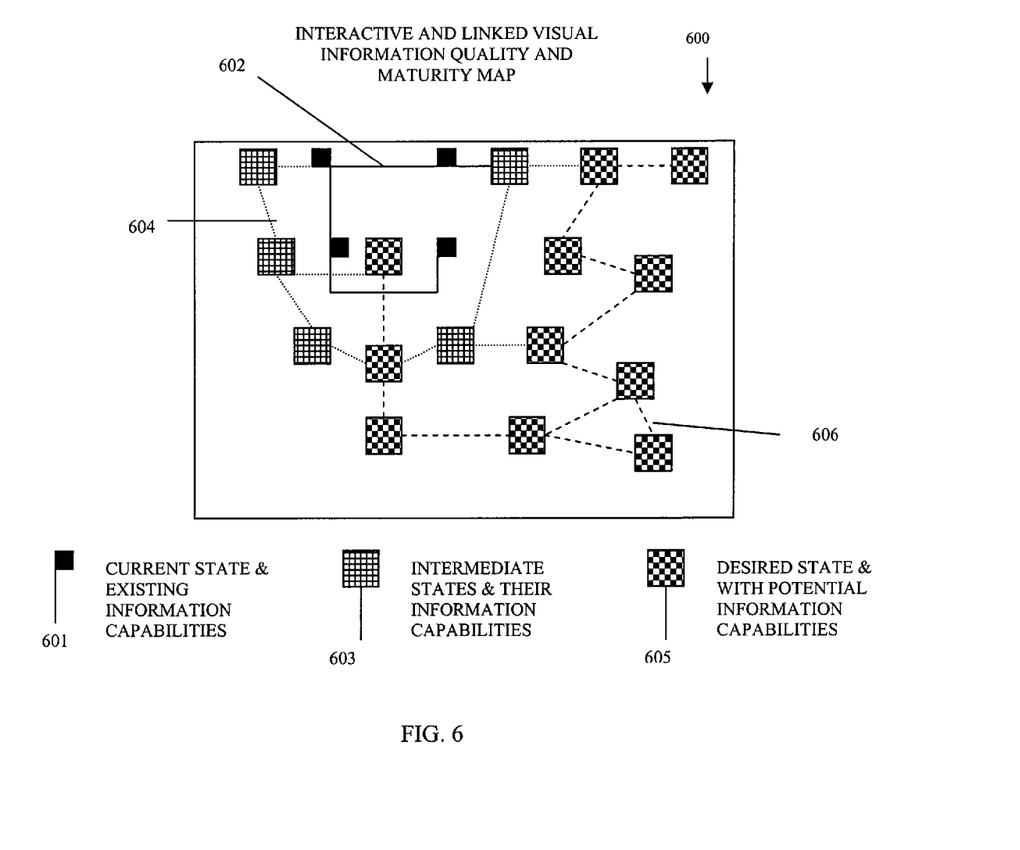
FIG. 6 depicts a diagram representing an example visual depiction of an information quality and maturity map.

FIG. 6 depicts a diagram 600 representing an example visual depiction of an information quality and maturity map. FIG. 6 is presented for purposes of illustration only and depicts just one example view of an information model that shows pathways from a current state through intermediate states, to a desired state. These state transitions represent needed information conditions for moving an information repository's information quality and maturity to the desired state. The view presented in diagram 600 can be generated and modified by the methods 100 and 200, systems 300, and data structures 400 discussed with embodiment of this invention.

As an example illustration, metric, levels of maturity, and capabilities are depicted as 601 having linkages or dependencies of 602. Intermediate states needed to move and create pathways based on dependencies are depicted as 603, their corresponding linkages and dependencies are shown as 604. The desired state is depicted as 605 and its linkages as 606.

Methods, systems, and data structures presented in this invention permit an organization to use an automated electronic framework for visualizing information quality and maturity. Moreover, this framework can be interacted with to provide individual guidance to an organization for systematically and optimally moving the condition of their information repository from its current state to a desired state of quality and maturity. Conventionally, no such models, techniques, or systems have been available and organizations have struggled with ad hoc attempts to improve their information repositories. Moreover, in some embodiments, some metric values can be null in which case corresponding levels of maturity or capability values can be affected and become null or can be altered based on the presence of a null metric value in a given set of three metric values.

The above description is intended to be illustrative, and not restrictive. Many other embodiments will be apparent to those of skill in the art upon reviewing the above description. The scope of embodiments of the invention should, therefore, be determined with reference to the appended claims, along with the full scope of equivalents to which such claims are entitled.

The Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Description of the Embodiments, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject mater lies in less than all features of a single disclosed embodiment. Thus the following claims are hereby incorporated into the Description of the Embodiments, with each claim standing on its own as a separate exemplary embodiment.

What is claimed is:

1. A method to model information quality and maturity, comprising:

associating quality metrics, levels of maturity, quality capabilities with one another; and providing an information quality map, wherein the map represents the quality metrics, the levels of maturity, and the quality capabilities integrated and linked with one another on the map, and wherein the map represents a current state for an information repository and transitions for moving from the current state to a desired information quality and maturity state, the map also depicts pathways for the transitions, each link within the pathways may be selected to show tasks that are organization specific and which detail steps internal to the organization that have to occur to move along the pathways to the desired information quality and maturity state.

2. The method of claim 1 further comprising representing the map as a geometric shape.

3. The method of claim 2 wherein in representing, the geometric shape is a three-dimensional object, wherein each quality metric is assigned to a particular connecting line and forms a single unique line of the three-dimensional object, each capability is assigned to a single unique surface area that is formed on the three-dimensional object by a unique set of three connecting lines, and each level is assigned to one of the three connecting lines.

4. The method of claim 1 further comprising providing the method as a remote electronic service.

5. The method of claim 4 further comprising, presenting the map on a display, wherein an interface is used to traverse the map.

6. The method of claim 5 wherein presenting further includes:

permitting the map to be dynamically traversed from links associated with the map and activated via the interface; and updating different electronic views for the map on the display after activation of one of the links.

7. The method of claim 1 wherein in associating, the quality metrics include at least one of functionality, integrity, sufficiency, availability, usability, contextual, complexity, responsiveness, adaptability, robustness, affordability, and accessibility defined values, and wherein the capabilities include values for at least one of power, meaningfulness, productivity, utilization, scalability, resiliency, serviceability, and value added, and wherein the levels of maturity include values for at least one of breakthrough, leading edge, advanced, intermediate, and foundation.

8. A method to model information quality and maturity, comprising:

using a service for accessing an interactive information modeling tool;

providing information quality metric values to the information modeling tool based on metric variables defined in the information modeling tool; and receiving a visual map from the service depicting an information quality current state for an information repository based on the values, and wherein the visual map is adapted to include a desired information quality and maturity state for the information repository depicting transitions from the current state as pathways to the desired information quality and maturity state, and wherein each link of the pathways is selectable to depict actions or tasks for moving along the pathways.

9. The method of claim 8 further comprising, accessing the information modeling tool for selecting an information quality desired state for the information repository.

10. The method of claim 9 further comprising, receiving an updated visual map from the service depicting the current state, one or more intermediate states, and the desired state, wherein the one or more intermediate states define steps that are needed to move an information quality of the information repository from the current state to the desired state.

11. The method of claim 8 wherein using further includes accessing the service remotely via an external network.

12. The method of claim 8 wherein using further includes accessing the service locally via an internal network.

13. The method of claim 8 wherein providing further includes, generating, by the information modeling tool, three information quality level values and an information quality capability value for each set of three provided information quality metric values.

14. The method of claim 8 wherein receiving further includes depicting, by the service, the visual map with discernable and interactive links for each set of three metric values, wherein each set of three metric values are associated with discernable and interactive links for levels associated with information quality maturity, and capabilities associated with the information quality, and wherein sets of the three metric variables, the corresponding levels and the corresponding capabilities are integrated with one another on the visual map.

15. An information modeling system, comprising:
an information modeling tool; and
an interface for interacting with the information modeling tool;
wherein the information modeling tool models information quality for an information repository, and wherein the interface is used for providing information quality metric values for a current state of the information repository, the information modeling tool uses the information quality metric values to produce a map representing the current state and to permit the map to depict pathways from the current state to a desired state for the information repository, each link of the pathways detailing actions or tasks for moving along the pathways toward the desired state.

16. The information modeling system of claim 15 wherein the interface is also used for selecting an information quality desired state for the information repository, and wherein the information modeling tool updates the map for representing the current and desired states simultaneously on the map.

17. The information modeling system of claim 16 wherein the information modeling tool updates the map to simultaneously represent the current state, one or more intermediate information quality states necessary to reach the desired state, and the desired state.

18. The information modeling system of claim 15 wherein the interface is used to interact with the information modeling tool via a remote service.

19. The information modeling system of claim 15 wherein the information modeling tool also provides, via interactions from the interface, discernable paths within the map from moving from the current state to an information quality desired state.

20. The information modeling system of claim 19 wherein the paths are determined by the tool based on selections made from weighted alternative paths that are available within the map from the current state in the direction of the desired state.

* * * * *